(12) United States Patent
Guenther et al.

(10) Patent No.: US 9,308,844 B2
(45) Date of Patent: Apr. 12, 2016

(54) HEAD RESTRAINT, IN PARTICULAR FOR A MOTOR VEHICLE

(75) Inventors: Benjamin Guenther, Solingen (DE); Alexander Stein, Leverkusen (DE)

(73) Assignee: Johnson Controls Technology Company, Holland, MI (US)

( * ) Notice: Subject to any disclaimer, the term of this patent is extended or adjusted under 35 U.S.C. 154(b) by 265 days.

(21) Appl. No.: 13/582,305

(22) PCT Filed: Jan. 12, 2011
(Under 37 CFR 1.47)

(86) PCT No.: PCT/EP2011/000093
§ 371 (c)(1),
(2), (4) Date: Mar. 4, 2013

(87) PCT Pub. No.: WO2011/107182
PCT Pub. Date: Sep. 9, 2011

(65) Prior Publication Data
US 2014/0028071 A1    Jan. 30, 2014

(30) Foreign Application Priority Data
Mar. 5, 2010   (DE) .......................... 10 2010 010 537

(51) Int. Cl.
*B60N 2/48*   (2006.01)
(52) U.S. Cl.
CPC ............ *B60N 2/4864* (2013.01); *B60N 2/4847* (2013.01)
(58) Field of Classification Search
CPC ..................................................... B60N 2/4847
USPC ............................................... 297/391, 398
See application file for complete search history.

(56) References Cited

U.S. PATENT DOCUMENTS

| 4,733,913 | A | * | 3/1988 | Tateyama | 297/409 |
| 6,082,817 | A | * | 7/2000 | Muller | 297/216.12 |
| 6,688,697 | B2 | * | 2/2004 | Baumann et al. | 297/391 |
| 6,805,411 | B2 | * | 10/2004 | Gramss et al. | 297/408 |
| 7,073,863 | B1 | * | 7/2006 | Low et al. | 297/404 |

(Continued)

FOREIGN PATENT DOCUMENTS

| CN | 1194616 A | 9/1998 |
| DE | 10047406 A1 | 4/2002 |

(Continued)

OTHER PUBLICATIONS

Chinese Examination Report date Mar. 25, 2014.

(Continued)

*Primary Examiner* — David R Dunn
*Assistant Examiner* — Timothy J Brindley
(74) *Attorney, Agent, or Firm* — Fletcher Yoder, P.C.

(57) ABSTRACT

The invention relates to a head restraint for a vehicle seat, in particular for a motor vehicle seat, wherein the head restraint has a cushion part facing the head of a seat occupant, a main body, and a comfort adjustment device, wherein in a usage situation of the head restraint the cushion part can be adjusted relative to the main body from a first position that is farther from the head of the seat occupant to a second position that is closer to the head of the occupant by means of the comfort adjustment device, wherein the cushion part can also be adjusted from the second position in the direction of the first position by means of the comfort adjustment device, wherein this requires a front extreme position of the cushion part to be set.

5 Claims, 1 Drawing Sheet

(56) References Cited

U.S. PATENT DOCUMENTS

| | | | |
|---|---|---|---|
| 7,770,967 B2* | 8/2010 | Hirota et al. | 297/216.12 |
| 8,491,052 B2* | 7/2013 | Werner | 297/216.12 |
| 2005/0280304 A1* | 12/2005 | Akaike et al. | 297/391 |
| 2007/0075578 A1* | 4/2007 | Klukowski | 297/391 |
| 2007/0246989 A1* | 10/2007 | Brockman | 297/391 |
| 2008/0030061 A1 | 2/2008 | Pejathaya | |
| 2009/0146479 A1* | 6/2009 | Boes et al. | 297/391 |
| 2009/0160235 A1* | 6/2009 | Hirota et al. | 297/391 |
| 2010/0026061 A1* | 2/2010 | McFalls et al. | 297/216.12 |
| 2010/0127541 A1* | 5/2010 | Kotz | 297/216.12 |
| 2010/0127548 A1* | 5/2010 | Truckenbrodt et al. | 297/391 |
| 2011/0198908 A1* | 8/2011 | Keller et al. | 297/391 |
| 2011/0316318 A1* | 12/2011 | Yamaguchi et al. | 297/410 |
| 2012/0032487 A1* | 2/2012 | Yamaguchi et al. | 297/354.1 |
| 2012/0080923 A1* | 4/2012 | Kunert et al. | 297/391 |
| 2013/0002000 A1* | 1/2013 | Delling et al. | 297/391 |
| 2013/0229042 A1* | 9/2013 | Kotz | 297/391 |
| 2013/0234491 A1* | 9/2013 | Schmitz et al. | 297/391 |
| 2013/0249268 A1* | 9/2013 | Hemmelrath et al. | 297/391 |
| 2014/0001811 A1* | 1/2014 | Haeske et al. | 297/409 |
| 2014/0028071 A1* | 1/2014 | Gunther et al. | 297/391 |

FOREIGN PATENT DOCUMENTS

| | | |
|---|---|---|
| DE | 10202598 A1 | 8/2003 |
| DE | 102006046975 A1 | 5/2007 |
| DE | 102008011336 A1 | 5/2009 |
| EP | 1491394 A1 | 12/2004 |
| EP | 1764261 A1 | 3/2007 |
| FR | 2564045 A1 | 11/1985 |
| FR | 2747349 A1 | 10/1997 |
| GB | 2336304 A | 10/1999 |
| JP | 60-154043 | 10/1985 |
| JP | 2002142910 A | 5/2002 |
| WO | 2005097545 A2 | 10/2005 |

OTHER PUBLICATIONS

International Search Report for application No. PCT/EP2011/000093 mailed Nov. 16, 2011.
German Office Action dated Aug. 20, 2010, 2pgs.
Korean Office Action dated Feb. 28, 2014.
Japanese Office Action dated Nov. 19, 2013.
International Preliminary Report on Patentability mailed Oct. 4, 2012.

* cited by examiner

HEAD RESTRAINT, IN PARTICULAR FOR A MOTOR VEHICLE

CROSS REFERENCE TO RELATED APPLICATIONS

This application claims priority from and the benefit of PCT Application No. PCT/EP2011/000093, filed on Jan. 12, 2011; and German Patent DE 10 2010 010 537.6, filed on Mar. 5, 2010; both entitled "Head Restraint, in Particular for a Motor Vehicle", which are herein incorporated by reference.

BACKGROUND

The invention relates to a head restraint, in particular for a motor vehicle.

A head restraint for a vehicle seat is disclosed in the publication WO 2005/097545 A2, in which at least one partial component of the head restraint facing the head of the seat occupant may be displaced as a result of an accident under the action of a drive device from a position of use toward the head of the seat occupant into a safety position. Similar head restraints are also disclosed in the publications DE 100 47 406 A1, DE 10 2006 046 975 A1 and EP 1 491 394 A1.

A head restraint for a vehicle seat is also disclosed in the publication DE 102 02 598 A1, in which a comfort adjustment option is provided.

Often, for the actuation of the comfort adjustment and/or the alteration of the comfort adjustment device the actuation of an operating element is required, such as for example a push button or the like, which in a motoring situation results in reduced safety and also results in the comfort being impaired.

SUMMARY

The object of the invention, therefore, is to provide a head restraint for a vehicle seat with increased functionality, increased usability and further increased safety during use, compared to the prior art.

The present invention is able to be used in combination with head restraints according to the previously cited WO 2005/097545 A2, reference being entirely made to the disclosure thereof to avoid repetition.

The object is achieved by a head restraint for a vehicle seat, in particular for a motor vehicle seat, wherein the head restraint has a cushion part facing the head of a seat occupant, a main body and a comfort adjustment device, wherein in a usage situation of the head restraint the cushion part is able to be adjusted relative to the main body from a first position further removed from the head of the seat occupant into a second position provided closer to the head of the seat occupant by means of the comfort adjustment device, wherein the cushion part may also be adjusted by means of the comfort adjustment device from the second position in the direction of the first position, wherein this requires the adjustment of a front extreme position of the cushion part.

As a result, it is possible by easy adjustment of the cushion part into the front extreme position to achieve an adjustability of the cushion part in a simple manner, such that not only starting from a (first) adjustment of the cushion part located further to the rear (i.e. further removed from the head of the vehicle occupant), a (second) adjustment of the cushion part located further to the front (i.e. closer to the vehicle occupant) is possible, but also starting from a (second) adjustment of the cushion part located further to the front (i.e. closer to the head of the vehicle occupant), a (first) adjustment of the cushion part located further to the rear (i.e. further removed from the head of the vehicle occupant) is possible without actuating operating elements, by only the cushion part being moved into a (front) extreme position (and optionally subsequently additionally into a (rear) further extreme position) and then being adjusted into the desired adjustment position.

According to the invention, it is particularly preferred if the comfort adjustment device has a control element which may be adjusted in a locked position and in an unlocked position, wherein with an adjustment of the control element in the locked position a direct movement of the cushion part is possible from the first position into the second position, a movement of the cushion part being blocked in the opposing direction, however, and wherein with an adjustment of the control element in the unlocked position a direct movement of the cushion part is possible from the first position into the second position and from the second position into the first position.

As a result, according to the invention a control of the locking of the positioning of the cushion part is possible by simple means, without further operating elements having to be actuated.

According to the invention, it is further preferred that the movement of the cushion part for comfort adjustment is a pivoting movement of the cushion part about a rotational axis extending substantially horizontally. As a result, one-handed operation of the adjustment of the cushion part is possible in a simple manner.

It is also preferred according to the invention if the adjustment force required for moving the cushion part in the direction from its first position into its second position is provided to be greater in the region of the extreme position, and/or if the cushion part may be adjusted into a plurality of latching positions, wherein the adjustment force required for adjustment in the direction from the first position into the second position of the cushion part is provided to be greater after the last latching position before the extreme position.

As a result, according to the invention it is advantageously possible that the last latching position and/or engaged position of the cushion part is safely and clearly identified by the user before the unlocking. As a result, it is advantageously possible, in a simple manner, in particular, to adjust safely the last latching position before the unlocking (i.e. before the extreme position of the cushion part) even when the comfort adjustment is operated for the first time. A further advantage is that the mechanism of the comfort adjustment of the cushion part is not inadvertently (and/or automatically) unlocked. In particular, as a result, a greater degree of comfort and a greater degree of safety is produced, as it is to be anticipated that the attention of a driver of a motor vehicle, for example, is distracted less from a motoring situation.

According to further preferred developments of the present invention, it is provided that for increasing the adjustment force a leaf spring and/or a spiral spring and/or a buffer function is provided, wherein the buffer function is provided, in particular, by means of a rubber material and/or by means of a foam material and/or by means of a linear damping element and/or by means of a rotational damping element about the rotational axis.

DRAWINGS

A purely exemplary embodiment of the invention is disclosed hereinafter with reference to the accompanying drawings.

DETAILED DESCRIPTION

Figure 1:
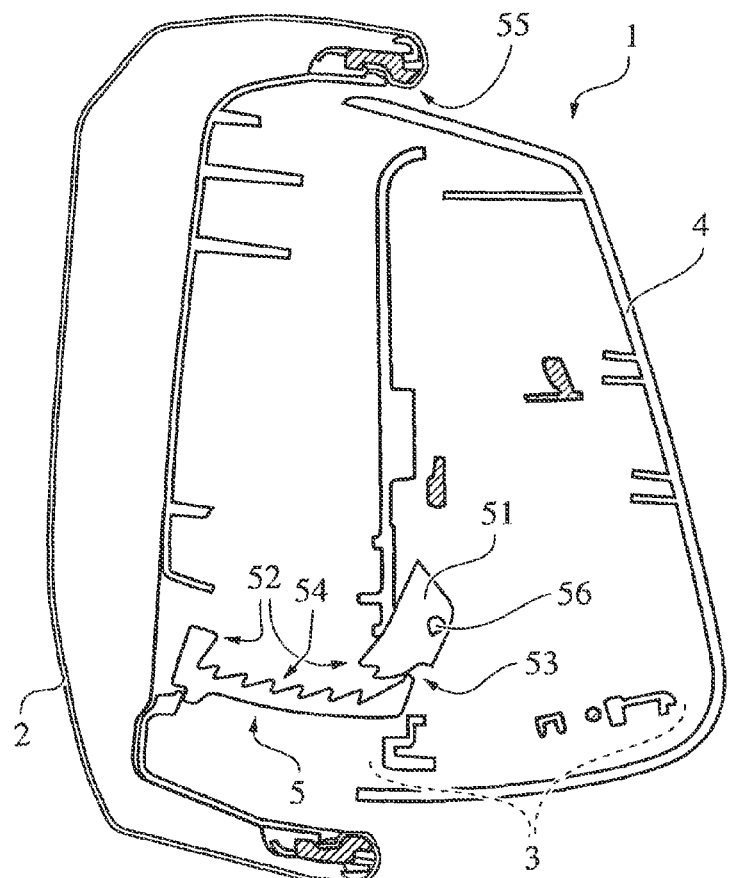
FIG. 1 shows schematically a sectional view through a head restraint according to the invention.

FIG. 1 shows in a schematic sectional view a head restraint 1 with a comfort adjustment mechanism 5 and/or a head restraint 1 designed according to the invention for a motor vehicle seat.

Figure 2:
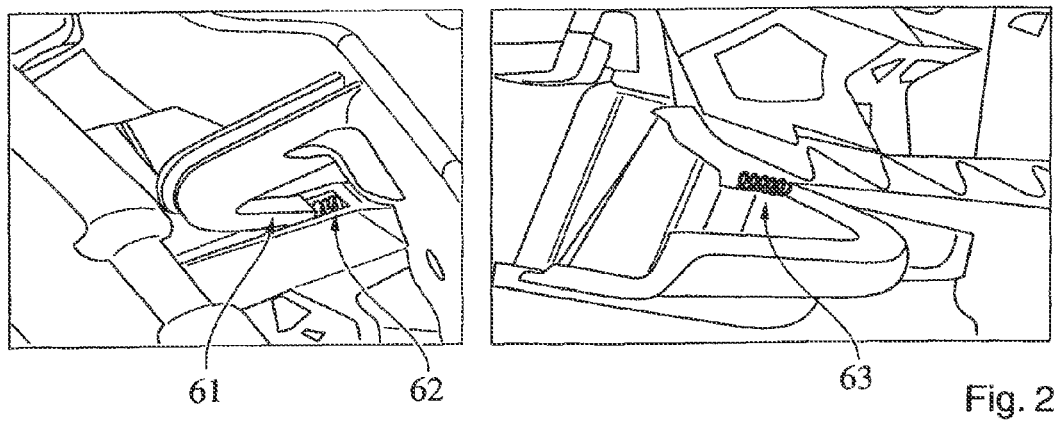
FIG. 2 shows schematically two detailed views of a head restraint according to the invention according to FIG. 1.

FIG. 2 shows schematically two detailed views of a head restraint 1 according to the invention and is described hereinafter together with FIG. 1.

The head restraint 1 has a main body 2 which is rigidly connected to a backrest (not shown) of a vehicle seat which is optionally also height-adjustable, via a pair of retaining rods (not shown). The main body 2 is connected to a cushion part 4 and the cushion part 4 is able to be displaced relative to the main body 2 to the front, toward the rear of the head of a vehicle occupant (to the right in the view according to FIG. 1) and/or to the rear, away from the rear of the head of the vehicle occupant (to the left in the view according to FIG. 1). The cushion part 4 may have a safety device 3, which carries out an additional displacement of the bearing surface of the cushion part 4 in the direction toward the head of the seat occupant when a specific situation is present, for example an accident situation (namely a so-called rear impact situation (rear crash), in which too great a distance between the bearing surface of the cushion part 4 and the head of the seat occupant may result in so-called whiplash being produced by the impact, which is intended to be prevented by the safety device).

According to the invention it is provided, in particular, that the displacement of the cushion part 4 relative to the main body 2 which is carried out for comfort purposes is provided by means of a rotary movement and/or a pivoting movement about a rotational axis 55. As a result, a particularly simple and intuitive operation of the comfort adjustment option of the head restraint 1 according to the invention is possible. According to the invention, it is provided in a particularly preferred manner that the rotational axis 55 extends approximately horizontally, quite particularly preferably in the upper region of the head restraint and/or main body 2.

A comfort adjustment device 5 is provided within the head restraint 1 between the cushion part 4 and the main body 2. The cushion part 4 may be displaced by means of the comfort adjustment device 5. To this end, the comfort adjustment device 5 comprises a control element 51 which may be adjusted in a locked position and in an unlocked position. In FIG. 1 the cushion part 4 is shown in an extreme position (furthest from the head of the seat occupant) and the control element 51 is shown adjusted in its unlocked position. The comfort adjustment device 5 comprises, in the example shown, a latching tooth system 54 which is in engagement with the control element 51 (not shown in FIG. 1), provided the control element 51 is in its locked position, which has to be visualized rotated to the left by approximately 20° to 40° relative to its adjustment shown in FIG. 1 (about a further rotational axis 56).

In the extreme position (shown in FIG. 1) of the cushion part 4, an adjustment of the control element 51 into its unlocked position takes place by the contact (and/or by the striking against one another) of two second bearing surfaces 53. By this contact and/or by this striking, the second bearing surfaces 53 effect a rotation of the control element 51 to the right (about the further rotational axis 56) so that the unlocked position of the control element 51 is adjusted. In the unlocked position of the control element 51, the cushion part 4 may be moved in any manner both in the direction (generally to the front) of the head of the occupant and in the opposing direction i.e. generally to the rear. According to the invention, a pretensioning of the cushion part 4 into the rear position may be preferably provided, namely by means of a pretensioning spring or an otherwise mechanical or electrical energy store. As a result, according to the invention it is preferably prevented that the cushion part is in undefined adjusted states.

If the cushion part is adjusted into a further extreme position (fully to the rear), two first bearing surfaces 52 come into contact (and/or strike one another) so that the control element 51 is adjusted (by rotation to the left according to the view in FIG. 1 about the further rotational axis 56) into its locked position. In this locked position of the control element 51, the control element 51 is latched to the latching tooth system 54 relative to a movement of the cushion part 4 to the rear (i.e. away from the head of the user) (i.e. it is not able to be moved in this direction) and not latched relative to a movement of the cushion part 4 to the front (i.e. toward the head of the user) (i.e. the cushion part 4 may be adjusted in incremental steps into different adjustment positions). According to the invention, in particular, the control element 51 is moved together with the cushion part 4 and the latching tooth system 54 is connected to the main body 2. Alternatively, however, this may be provided in reverse.

According to the invention, it is preferred if the adjustment force required for moving the cushion part 4 in the direction from its first position into its second position is provided to be greater in the region of the (front) extreme position. In particular, it is preferably provided if the cushion part 4 is able to be adjusted into a plurality of latching positions, wherein the adjustment force required for adjustment in the direction from the first position into the second position of the cushion part 4 is provided to be greater after the last latching position (adjustable in a latchable manner) before the (front) extreme position. As a result, it is advantageously possible according to the invention for the last latching position and/or engaged position of the cushion part before unlocking to be safely and clearly identified by the user, so that the frontmost latchable adjustment position may also be reached safely, even when the comfort adjustment is operated for the first time. For implementing a greater adjustment force in the region of the extreme position, in the detailed views according to FIG. 2 an abutment 61 and a spring 62 (left detailed view according to FIG. 2) and/or bearing 63 of a spring in the end stop are shown (right detailed view according to FIG. 2). According to the invention, for increasing the adjustment force, for example, a leaf spring and/or a spiral spring and/or a buffer function may generally be provided, wherein the buffer function may be provided, in particular, by means of a rubber material and/or by means of a foam material and/or by means of a linear damping element and/or by means of a rotational damping element about the rotational axis 55.

The invention claimed is:

1. A head restraint for a vehicle seat comprising a cushion part configured to be positioned rearward of a head of a seat occupant along a longitudinal axis and to face the head of the seat occupant, a main body, and a comfort adjustment device, wherein the cushion part is positioned forward of the main body along the longitudinal axis, the comfort adjustment device is positioned between the cushion part and the main body along the longitudinal axis, the cushion part is directly rotatably coupled to the main body, the cushion part is movable relative to the main body only by pivoting movement about a substantially horizontal rotational axis, and the substantially horizontal rotational axis is located above the comfort adjustment device in a vertical direction;

wherein in a usage situation of the head restraint, the cushion part is able to be adjusted relative to the main body by the comfort adjustment device from a first position configured to be further removed from the head of the seat occupant into a second position forward of the first position along the longitudinal axis and configured to be closer to the head of the seat occupant, wherein the cushion part may also be adjusted by the comfort adjustment device from the second position in the direction of the first position only by movement of the cushion part to a front extreme position that is forward of the second position;

wherein the comfort adjustment device has a control element which is adjustable into a locked position and into an unlocked position, wherein with an adjustment of the control element into the locked position, a direct movement of the cushion part is possible from the first position into the second position, a movement of the cushion part being blocked in the opposing direction, however, and wherein with an adjustment of the control element into the unlocked position, a direct movement of the cushion part is possible from the first position into the second position and from the second position into the first position;

wherein the comfort adjustment device comprises a latching tooth system configured to interact with the control element, and the latching tooth system comprises a first bearing surface configured to drive the control element to the locked position via contact with a second bearing surface of the control element upon movement of the cushion part to a rear extreme position, rearward of the first position along the longitudinal axis;

wherein the control element is configured to move with the cushion part relative to the main body, and the latching tooth system is connected to the main body.

2. The head restraint as claimed in claim 1, wherein an adjustment force sufficient to move the cushion part from the first position into the second position is greater in a region proximate to the front extreme position.

3. The head restraint as claimed in claim 1, wherein the cushion part may be adjusted into a plurality of latching positions, including the first position and the second position, wherein an adjustment force sufficient to move the cushion part in a forward direction is greater within a region between a forward-most latching position of the plurality of latching positions and the front extreme position.

4. The head restraint as claimed in claim 2, comprising a leaf spring configured to increase the adjustment force.

5. The head restraint as claimed in claim 2, comprising a spiral spring configured to increase the adjustment force.

* * * * *